(12) United States Patent
Turqueti et al.

(10) Patent No.: US 11,142,589 B2
(45) Date of Patent: Oct. 12, 2021

(54) HIGH ALPHA AND HIGH INTRINSIC VISCOSITY PULP PRODUCTION APPARATUSES, METHODS AND SYSTEMS

(71) Applicant: Bracell Bahia Specialty Cellulose SA, Bahia (BR)

(72) Inventors: André de Azambuja Turqueti, Bahia (BR); Vinicius de Oliveira Rodrigues Gonçalves, Bahia (BR)

(73) Assignee: Bracell Bahia Specialty Cellulose SA, Bahia (BR)

( * ) Notice: Subject to any disclaimer, the term of this patent is extended or adjusted under 35 U.S.C. 154(b) by 24 days.

(21) Appl. No.: 16/442,306

(22) Filed: Jun. 14, 2019

(65) Prior Publication Data

US 2020/0392255 A1 Dec. 17, 2020

(51) Int. Cl.

| D21C 9/10 | (2006.01) |
|---|---|
| C08B 11/193 | (2006.01) |
| C08B 1/08 | (2006.01) |
| C08B 11/08 | (2006.01) |
| D21C 9/00 | (2006.01) |
| D21H 21/18 | (2006.01) |
| D21H 11/16 | (2006.01) |
| D21H 13/04 | (2006.01) |
| D21H 13/08 | (2006.01) |

(Continued)

(52) U.S. Cl.
CPC .............. *C08B 11/193* (2013.01); *C08B 1/08* (2013.01); *C08B 11/08* (2013.01); *D21C 9/004* (2013.01); *D21C 9/005* (2013.01); *D21C 9/10* (2013.01); *D21H 11/16* (2013.01); *D21H 13/04* (2013.01); *D21H 13/08* (2013.01); *D21H 17/26* (2013.01); *D21H 17/27* (2013.01); *D21H 21/18* (2013.01)

(58) Field of Classification Search
CPC .......... D21C 9/004; D21C 9/005; D21C 9/10; D21H 11/16; D21H 13/04; D21H 13/08; D21H 17/26; D21H 17/27; D21H 21/18
See application file for complete search history.

(56) References Cited

U.S. PATENT DOCUMENTS

| 3,627,630 A | 12/1971 | Gagnon et al. |
|---|---|---|
| 5,589,033 A | 12/1996 | Tikka et al. |

(Continued)

FOREIGN PATENT DOCUMENTS

CN 102337689 A 2/2012

OTHER PUBLICATIONS

PCT Search Report and Written Opinion for PCT/IB19/00599, dated Nov. 27, 2019.

*Primary Examiner* — Jacob T Minskey
(74) *Attorney, Agent, or Firm* — Irell and Manella, LLP (57) ABSTRACT

The HIGH ALPHA AND HIGH INTRINSIC VISCOSITY PULP PRODUCTION APPARATUSES, METHODS AND SYSTEMS (hereinafter "HIGH-A HIGH-IV PULP PRODUCTION") disclosed herein provide for pulp processing used in connection with Kraft Processes (KP) or Pre Hydrolysis Kraft Processes (PHKP), embodiments employing a Cold Caustic Extraction (CCE) stage and/or appropriate washing and bleaching stages, resulting in pulp with high Intrinsic Viscosity (IV) and high purity, such as may be as determined by alpha cellulose content, and adequate brightness for use downstream in applications such as high tensile regenerated cellulose and ether applications, or other applications employing high IV pulp with significant purity (e.g., alpha cellulose>92%).

8 Claims, 8 Drawing Sheets

(51) Int. Cl.
*D21H 17/26* (2006.01)
*D21H 17/27* (2006.01)

(56) References Cited

U.S. PATENT DOCUMENTS

| | | |
|---|---|---|
| 6,264,790 B1 | 7/2001 | Jakara et al. |
| 8,535,480 B2 | 9/2013 | Leite |
| 8,734,612 B2 | 5/2014 | Leite |
| 2011/0272110 A1 | 11/2011 | Leite |
| 2013/0296545 A1 | 11/2013 | Sixta et al. |
| 2015/0136346 A1 | 5/2015 | Bogren et al. |
| 2018/0119345 A1 | 5/2018 | Sixta |

| STREAM | VOLUME (m³/Bdmt) | EA (g/l as NaOH) | TEMPERATURE |
|---|---|---|---|
| STEAM | - | - | 140 - 210°C |
| WATER AND/OR HYDROLYSATE | 0-5 | - | 30 - 130°C |
| STEAM | - | - | 140 - 210°C |
| WATER AND/OR HYDROLYSATE | 0-5 | - | 30 - 130°C |
| STEAM | - | - | 140 - 210°C |
| WHITE LIQUOR | 0 TO 0.5 | 120 | 80 - 95°C |
| WHITE LIQUOR/CCE FILTRATE | 2.0 TO 4.0 | 120/40-60 | 120°C |
| BLACK LIQUOR | 2.0 TO 3.0 | 10 TO 20 | 160°C |
| WHITE LIQUOR/CCE FILTRATE | 0 TO 0.8 | 120/40-60 | 160°C |
| STEAM | - | - | 140 - 210°C |
| WHITE LIQUOR + CCE FILTRATE | 0 TO 0.8 | 120/40-60 | 160°C |
| WASH LIQUOR | UP TO 8 | 5 | 75°C |
| WASH LIQUOR | UP TO 3 | 5 | 75°C |

HIGH ALPHA AND HIGH INTRINSIC VISCOSITY PULP PRODUCTION APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address pulp processing, and more particularly, include HIGH ALPHA AND HIGH INTRINSIC VISCOSITY PULP PRODUCTION APPARATUSES, METHODS AND SYSTEMS.

BACKGROUND

The use of pre-hydrolysis kraft process ("PHKP") associated to cold caustic extraction ("CCE") has been described previously, such as U.S. Pat. Nos. 8,734,612 and 8,535,480. Both patents are hereby incorporated by reference as if set forth fully herein. A schematic description of such a method is given as a block diagram in FIG. 1.

The association of cooking process and CCE process has been described and presents useful industrial application for production of high purity pulps (alpha cellulose content from 96% to 98%). One aspect of the art is the management of CCE filtrate as an alkali source, avoiding or at least minimizing the precipitation of hemicelluloses, and has been successfully used in industrial installation.

Resulting pulp is washed, bleached and dried in appropriate manner to result in commercial product especially suitable to manufacture of cellulose acetate (tri-acetate and di-acetate).

Such process produces Elemental Chlorine Free (ECF) bleached pulp with typical IV of 700 mg/l at high brightness level (above 92% ISO) that can be extended up to 800 mg/l at normal market pulp brightness (89% to 90% ISO).

Cooking process may be conducted in batch or continuous installations. State of art installations are batch with most of current production of high purity pulp.

Batch cooking plants implement PHKP in a very effective way, producing high quality product through long times (year or more) without necessity to stop for cleaning or convert to KP production.

Continuous cooking PHKP has been historically tried in single vessel installations producing pulp of acceptable quality, but with fouling problems leading to short campaign times and the need to run KP campaigns or stop the unit for cleaning (typically measure in a few weeks' time).

Recently PHKP has been re-introduced in continuous cooking by means of a 2 vessel system separating the PH phase from KP phase. This system seems to have a better performance but still suffers from some fouling problems.

Figure 1:
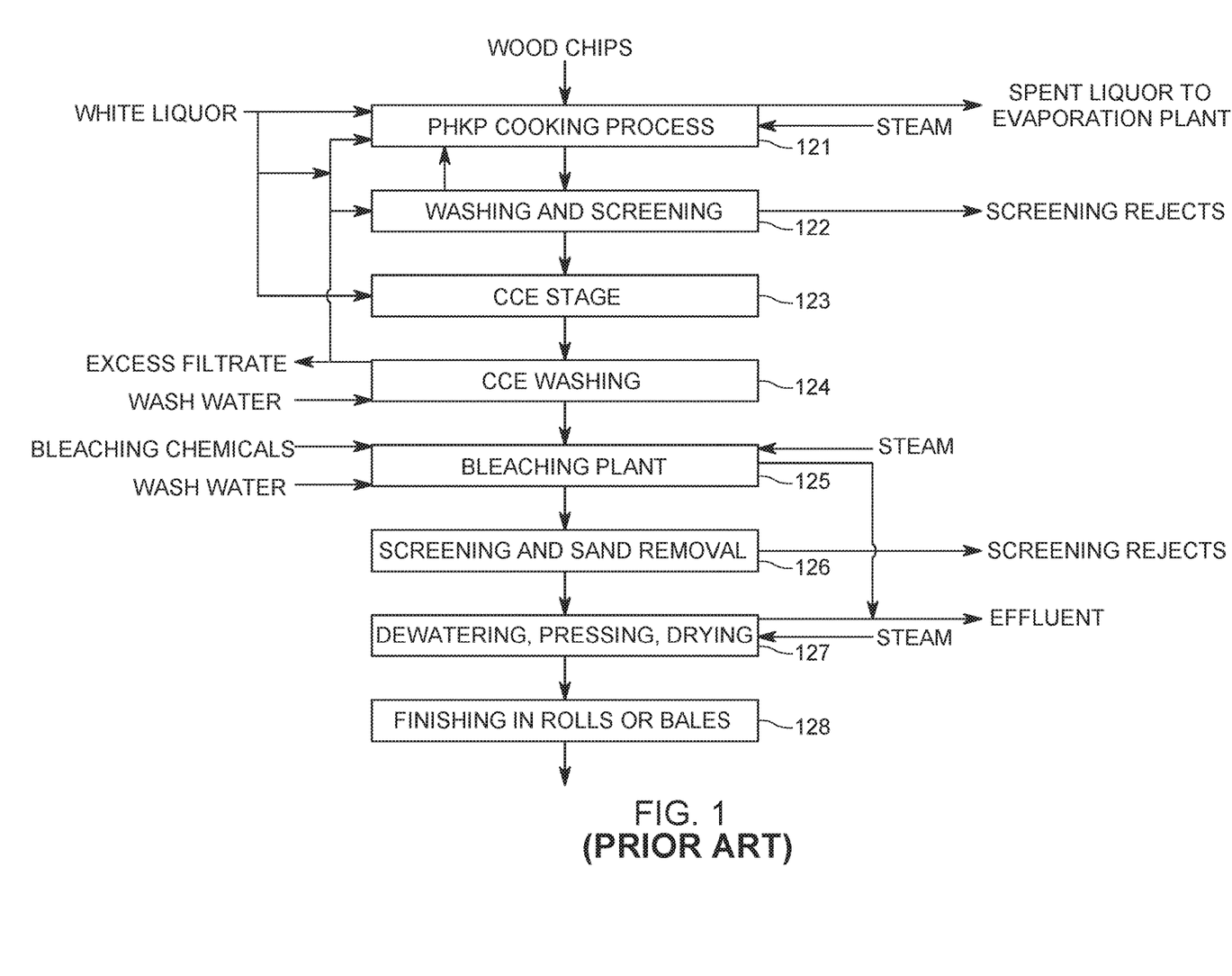
FIG. 1 presents an example of prior art process flow for pulp production.

In such system most of the purification work is done in the PHKP cooking 121, with a typical removal of more than 80% of the hemicellulose present in the wood. Typically such cooking process will deliver pulp with alpha cellulose content in the range of 94-96%.

Pulp from cooking will typically have Kappa Number ("KN") in the range 7 to 13 and IV in the range 700-1100 depending on raw material and cooking conditions (P factor (PF) typically >200, H factor (HF) typically <500, alkali charge typically 18-24% Effective Alkali as NaOH on oven dry (OD) wood basis).

After cooking, pulp is washed and cleaned to remove debris 122, uncooked material and other rejects, following to the CCE stage 123.

The subsequent CCE stage will boost purity level up to 98% in alpha cellulose by application of alkali charge in the range of 300-600 kg NaOH/kg OD pulp and temperatures up to 50° C.

As mentioned before CCE acts by solubilizing the low molecular weight substances present in the pulp fiber. With such action not only hemicellulose and degraded cellulose molecules are removed from the fibers, but also some degraded lignin is removed, resulting in a KN drop of up to 3 units.

After CCE stage, pulp is washed 124 to remove residual caustic content and also lignin, hemicellulose and low degree of polymerization ("dp") cellulose in CCE process. The filtrate from this process is referred to as CCE filtrate or CCE liquor, and is recycled to cooking process. Excess filtrate can be exported for other areas (e.g., evaporation plant, hemicellulose recovery plant, lignin recovery plant, other pulp production line, etc.).

In bleaching plant 125 pulp residual lignin is chemically removed and brightness is increased in a multi stage setup with typically 2 to 5 stages. The bleached pulp may then be subjected to further screening and/or sand removal 126; dewatering, pressing and/or drying 128; and finishing in rolls or bales 128 to result in commercial product especially suitable to manufacture of cellulose acetate (tri-acetate and di-acetate).

An ECF process may include Chlorine Dioxide (D) stage, Alkaline Extraction (E) stage, Oxygen (O2) stage and Peroxide (P) stage.

D-P being an instance of 2 stage sequence and D-E-D-E-D being an instance of 5-stage sequence, where E may or may not be reinforced by O2 or Peroxide. Other chemicals like Per Acetic Acid (PAA) or enzymes may be used.

Total Chlorine Free (TCF) bleaching will be typically 2 or 3 stages with O2, Ozone (O3) and P stages. PAA and enzymes may be also used.

TCF bleaching in general is less selective leading to lower bleached pulp viscosity.

Pulp bleaching is not a perfectly selective process and cellulose IV will be typically reduced by at least 100 mg/l, and more typically 200-300 mg/l, resulting in lower final product viscosity, lower overall process yield (conversion of wood to final goods) and sometimes lower pulp purity (as alpha-cellulose) due to cellulose degradation.

SUMMARY

The HIGH ALPHA AND HIGH INTRINSIC VISCOSITY PULP PRODUCTION APPARATUSES, METHODS AND SYSTEMS (hereinafter "High-A High-IV Pulp Production") disclosed herein in various embodiments provide for pulp processing used in connection with Kraft Processes ("KP") and Pre Hydrolysis Kraft Processes ("PHKP"), embodiments employing a Cold Caustic Extraction ("CCE") stage and/or appropriate washing and bleaching stages, resulting in pulp with high Intrinsic Viscosity ("IV") and high purity, such as may be as determined by alpha cellulose content, and adequate brightness for use downstream in applications such as high tensile regenerated cellulose and ether applications, or other applications employing high IV pulp with significant purity (e.g., alpha cellulose>92%).

In one embodiment, an improved method is disclosed for generating high IV pulp with good purity and brightness levels by means of the combined used of cooking and CCE process, where filtrate from CCE stage may be used in cooking process without any previous purification treatment. A suitable bleaching process of high selectivity is indicated as a means to maximize final product IV.

In one aspect, the method includes the use of non-purified CCE filtrate in the cooking step, while the aforementioned art states that purification by membrane separation like Nano or Ultra filtration is required.

The performance of a CCE filtrate purification process is eliminated, in some embodiments, by the use of White Liquor Pad.

In another aspect, the current application produces high Intrinsic Viscosity pulp, suitable for cellulose ether and high tensile regenerated cellulose, while in aforementioned art conditions are optimized to produce pulp suitable for Lyocell or Viscose application, that are low Intrinsic Viscosity products for textile market.

In KP and PHKP, H-factor is described as a control parameter combining reaction temperature and reaction time from cooking stage so as to reach a desired lignin content in the end of said stage. Lignin content may be indirectly determined, e.g., by KN (described in Tappi T-236) or similar test methods form other standards (e.g., as ISO, ASTM, NBR, JIS, and/or the like).

Likewise in PHKP, P-factor is described as a control parameter combining reaction temperature and reaction time from pre-hydrolysis stage, in order to reach desired pulp purity as an end result of the whole cooking process. Pulp purity may be indirectly determined, e.g., by alpha cellulose test (Tappi T-203) or alkali solubility methods (Tappi T-235) or similar from other standards.

The dp of cellulose can be indirectly evaluated, e.g., by means of Intrinsic Viscosity test method (ISO 5351) or similar from other standards, were IV bears a direct correlation with cellulose dp. High IV values indicate high cellulose dp, and conversely low IV indicates low cellulose dp, typically resulting from extensive cellulose degradation.

More accurate dp measurements can be performed, e.g., by gel permeation chromatography of dissolved cellulose polymer, but that method may not be practical in some instances for process control, so IV or other equivalent viscosity measurement may alternatively be adopted.

Embodiments of the CCE stage use a low temperature high alkalinity environment to induce extensive pulp swelling, leading to diffusion of low molecular weight material such as hemicelluloses, degraded cellulose and degraded lignin, increasing the alpha cellulose content of the resulting pulp.

BRIEF DESCRIPTION OF THE DRAWINGS

The accompanying appendices and/or drawings illustrate various non-limiting, example, innovative aspects in accordance with the present descriptions.

DETAILED DESCRIPTION

The HIGH ALPHA AND HIGH INTRINSIC VISCOSITY PULP PRODUCTION APPARATUSES, METHODS AND SYSTEMS (hereinafter "High-A High-IV Pulp Production") disclosed herein in various embodiments address optimization of process conditions from the combined cooking and CCE stages resulting in high IV bleached pulp (e.g., >1200 ml/g, alpha cellulose content >94% and pulp brightness >89% ISO). The optimized conditions go beyond the original described conditions in previous art, but do not require changes in main equipment.

Embodiments of High-A High-IV Pulp Production may also be applied to continuous cooking processes, bringing potential process benefits regarding process simplification and reduced equipment scaling potential.

Embodiments of High-A High-IV Pulp Production may include the redistribution of purification work done in cooking and CCE stages, shifting most of the purification effect to the CCE stage (e.g., 55% or more of hemicellulose reduction; in some implementations, 90% or more), while reducing the cooking process hemicellulose reduction effect.

This change in purification strategy, combined with described modifications in cooking process and adequate, i.e., selective bleaching conditions results in high viscosity pulp with dissolving grade purity and brightness, suitable for specialty applications such as cellulose ethers and high strength regenerated cellulose.

CCE filtrate can be partially or completely recycled to the cooking plant without any treatment as applied in previous art U.S. Pat. No. 8,734,612, which is incorporated in its entirety herein by reference.

Pulp produced from cooking will typically have viscosity above 1200 ml/g at a bleachable KN (below 20 for hardwood pulp) and purity above 85% in alpha cellulose.

In the subsequent CCE stage, pulp purity is increased up to 96% alpha cellulose content. For some applications in which mercerized cellulose content is irrelevant, alpha cellulose purity may be increased up to 98%.

KN will drop significantly (typically 4-5 units) and once most of low dp cellulose and hemicellulose products are removed a significant increase in average pulp dp is seen, bringing IV above about 1300 ml/g level.

In some implementations, a subsequent high selectivity bleaching sequence with 2 or 3 stages (D-P or D-EP-D) will bring brightness to a commercial level (e.g., 88%-91% ISO; in some implementations 89%-90% ISO) at final IV level above 1200 ml/g.

See comparison of previous art results with current results on table 1.

TABLE 1

Results of pilot scale experiments demonstrating the current art pulp quality compared with prior art pulp quality (U.S. Pat. No. 8,734,612). Raw material used was *Eucalyptus Urograndis*. Pulp produced at same brightness and purity level that can be reached in previous art with 30% higher Intrinsic Viscosity.

| Pulp Quality Parameter | Prior Art (U.S. Pat. No. 8,734,612) | Current |
|---|---|---|
| Intrinsic Viscosity (g/ml) | 950 | 1270 |
| Brightness (% ISO) | 90.0 | 90.7 |
| S18 (%) | 3.8 | 3.2 |
| S10 (%) | 4.7 | 4.0 |
| Calculated alpha cellulose (%) | 95.8 | 96.4 |

Such viscosity and purity levels are not currently available from Hardwood KP or PHKP, being only obtained by Sulphite cooking of Softwood or by the use of cotton linter.

The CCE filtrate will have high hemicellulose content and also significant lignin content, being a potential candidate for hemicellulose and lignin recovery process. Independently of such recovery processes, the CCE Filtrate can be recycled to the cooking plant without other treatment than temperature and alkalinity adjustments as the main alkali source for the cooking process (e.g., more than 70% of total EA charge applied on BD wood).

Examples of process conditions to achieve the desired viscosity and purity levels are described in the following exemplary statements.

In implementations, the raw material can be hardwood, softwood or non-wood source.

Cooking method may be PHKP, with KP being considered as a particular case of PHKP were P factor is 0 (Zero).

Cooking equipment may be batch cook or continuous.

Figure 2:
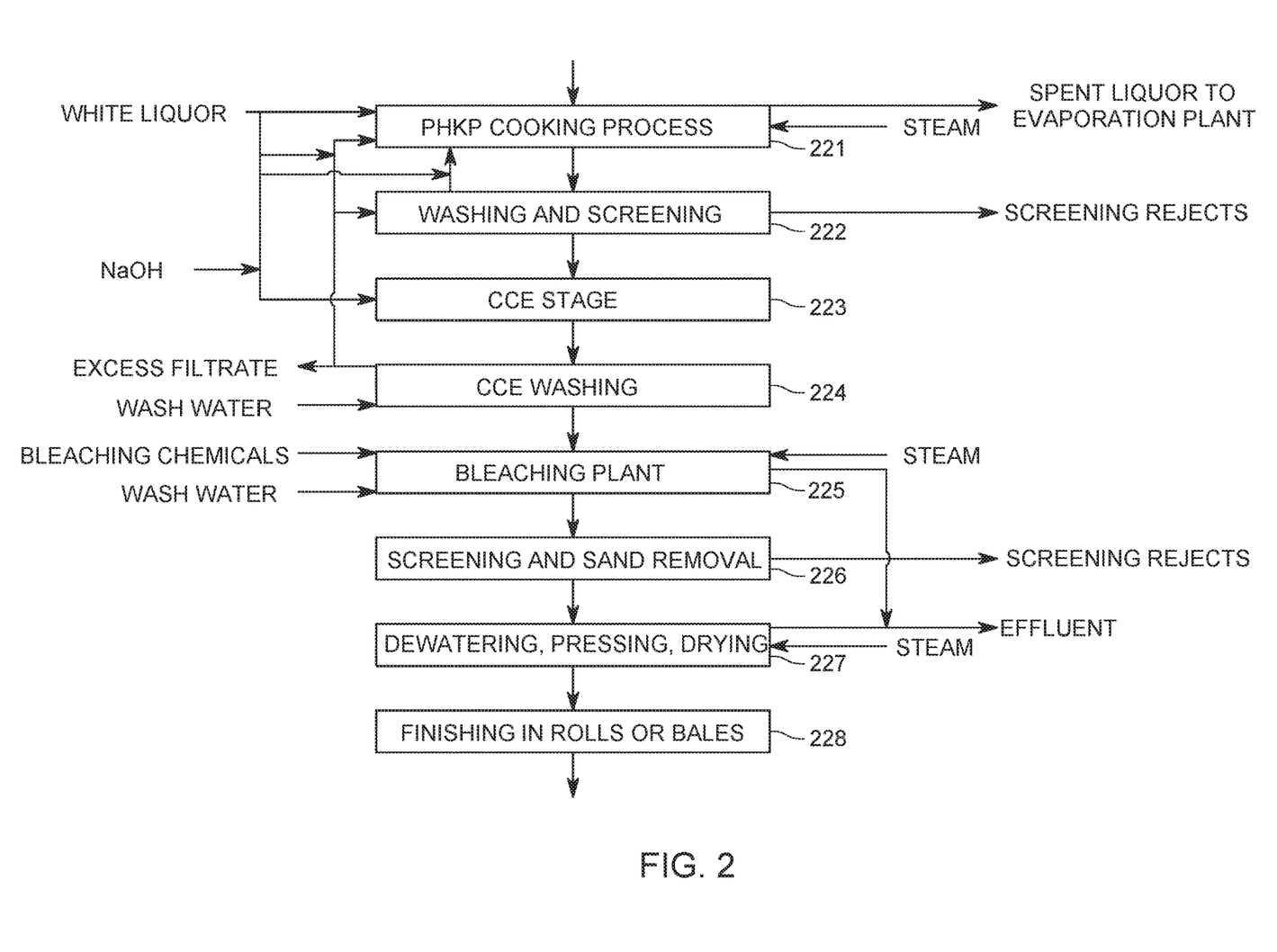
FIG. 2 shows an example process flow diagram in one embodiment of High-A High-IV Pulp Production.

FIG. 2 shows an example of logic flow for high-A high-IV pulp production in one embodiment from raw material to finished product.

Figure 3A:
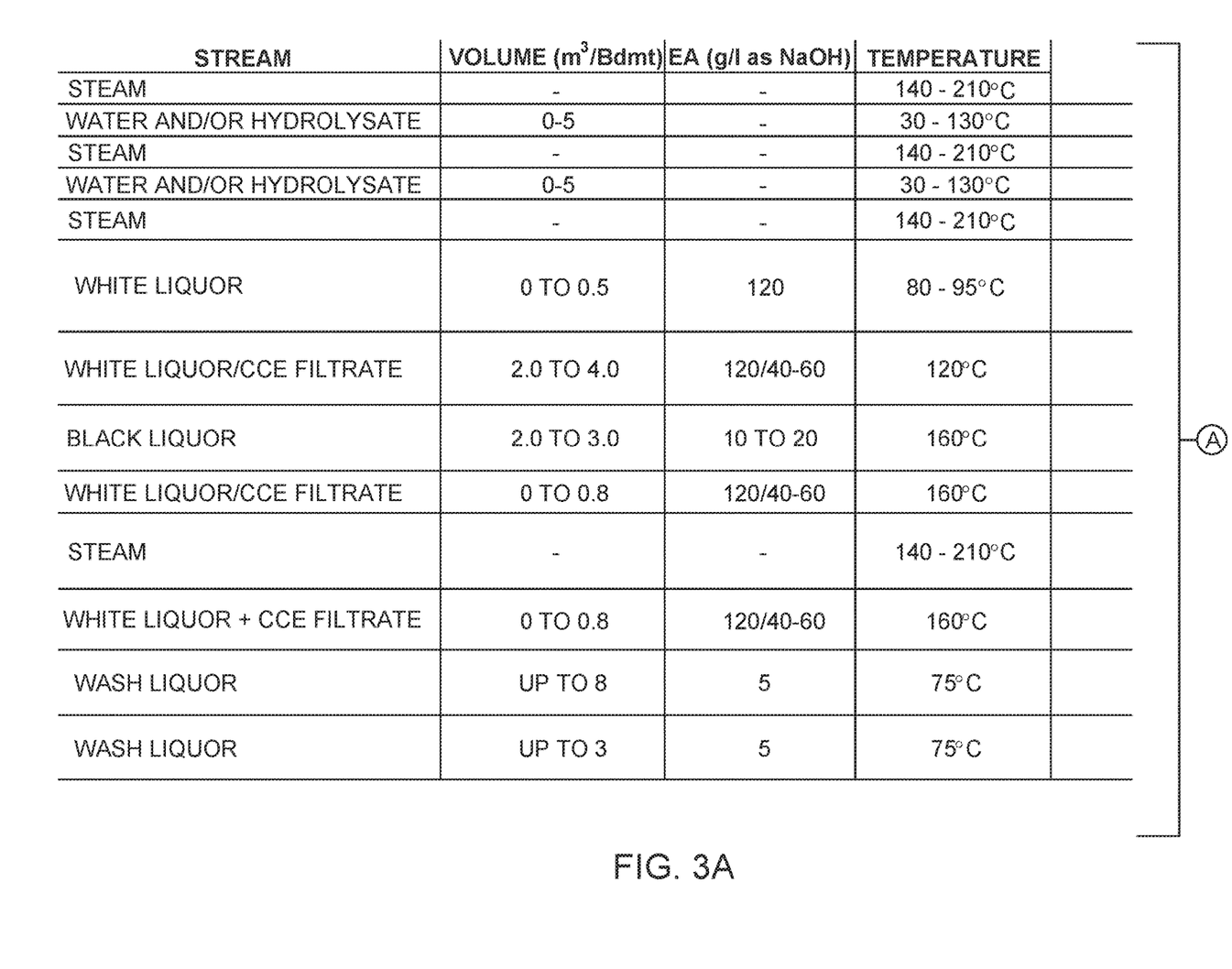
FIGS. 3A-3B show a cooking recipe, including logical flow and detailed process parameters, of the cooking process in one embodiment of High-A High-IV Pulp Production.
Figure 3B:
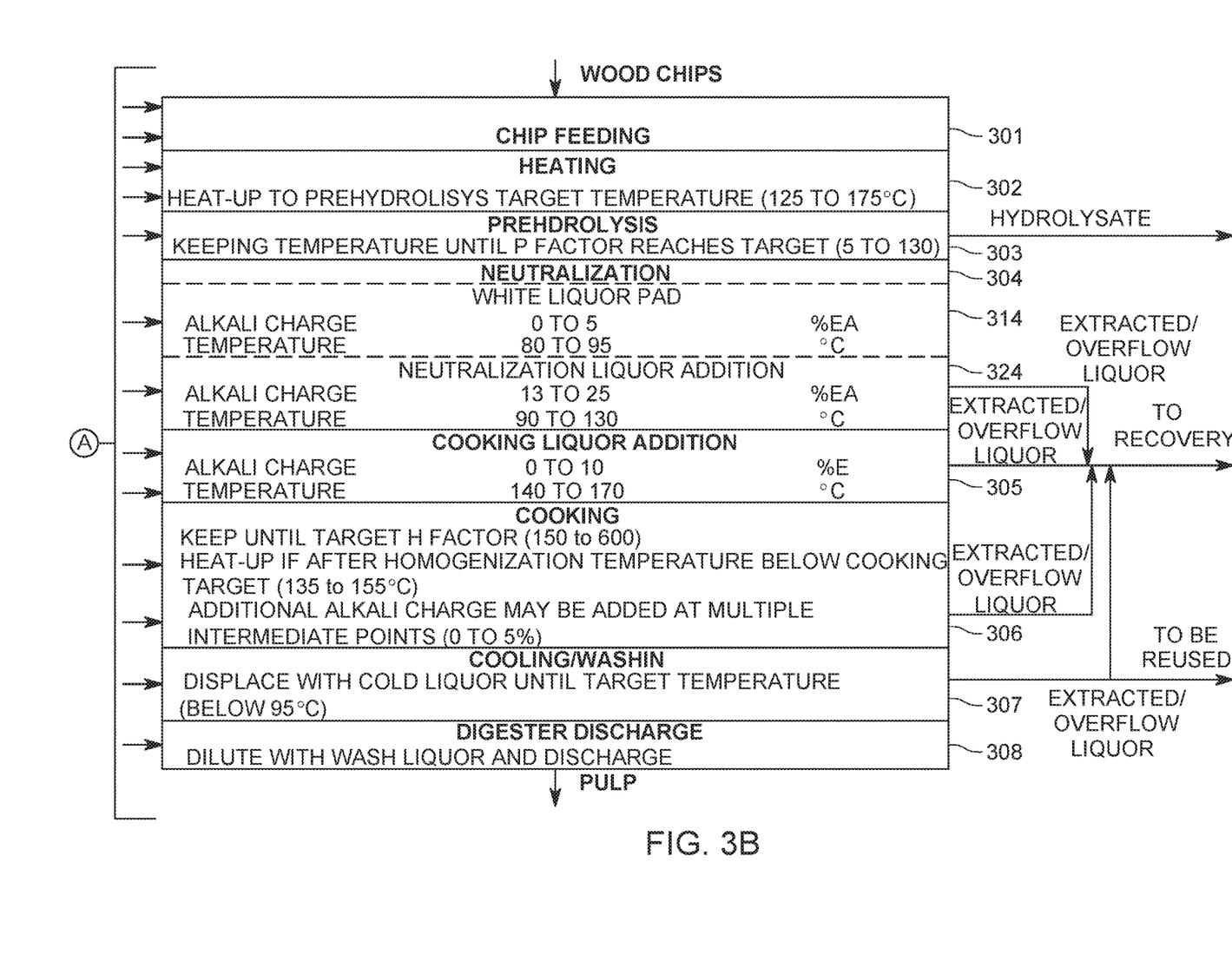

FIGS. 3A-3B present detailed cooking process parameters, i.e., the cooking recipe, for high-A high-IV pulp production in one embodiment. In one embodiment, actual conditions in one or more steps may slightly deviate from the ones presented due to implementation particularities (e.g. batch or continuous digester, or different strainer set arrangement on continuous digesters) or due to other accessory processes limitations (e.g. steam supply or evaporation plant). Detailed procedures of each step in the cooking recipe are disclosed further. Some steps may have alternative procedures disclosed, but not represented in the recipe flowsheet for simplification.

In some implementations, a PHKP cooking process 221 may include wood chips being fed into the digester 301 and heated 302 to, e.g., 110-135° C. (e.g., in one implementation to 115-125° C.) with, e.g., direct steam injection or similar method and kept at such temperature for time enough 303 to reach a P factor from 0 to 100 (e.g., in one implementation, from 10 to 30). In this condition air removal is at acceptable levels and a mild pre hydrolysis will take place (no pre hydrolysis for the particular case of 0 P factor).

In one implementation, the acid aqueous phase containing hemicellulose, cellulose and lignin degradation products, referred as hydrolysate, may be extracted or displaced from the digester. This stream can be recycled to the chip feeding and/or chip heating step as a form of heating or chip transport media. In one implementation, the hydrolysate can be purified and its key valuable molecules, such as acetic acid, furfural and sugar monomers and oligomers, separated as an additional revenue stream, or can be neutralized with any alkaline stream and sent to the evaporation plant.

A next step, in one implementation, includes the addition of a white liquor pad 314, e.g., to avoid hemicellulose and lignin precipitation. In one implementation, the white liquor pad amount will correspond to 0-5% of the BD wood weight.

A next step, in one implementation, includes the addition of a high volume of CCE filtrate 324 for wood chip alkali impregnation, e.g., corresponding from 70 to 100% of total alkali requirement for cooking.

This filtrate may have a typical concentration of, e.g., 20 to 80 g Effective Alkali (EA)/l, with EA expressed as NaOH (e.g., in one implementation, 40-60 g EA/l). This filtrate may have its concentration increased by addition of white liquor.

In some implementations, CCE filtrate will be pre heated to, e.g., 90-140° C. (e.g., in one implementation, to 120-130° C.).

Sufficient impregnation time can be achieved, by leaving the digester static or circulating the liquor through the digester in the case of batch digesters, or having a sufficient retention time at the impregnation zone in continuous digesters.

A next step, in some implementations, includes heating of chips to reach the desired cooking temperature, e.g., in the range of 130-160° C. (e.g., in one implementation to 140-150° C.). Heating can be provided, for example, by the addition of hot black liquor that will displace the spent CCE filtrate and/or by forced circulation of the digester liquor to an external heat exchanger, or another form of external heating.

With implementations including the addition of hot black liquor 305, concentration of, e.g., 5-45 g EA/l (e.g., in one implementation 10-20 g EA/l) may be employed in some implementations and can be adjusted by addition of fresh white liquor or CCE filtrate. Black liquor temperature may be, e.g., 130-170° C. (e.g., in one implementation, 150-160° C.). The addition of hot black liquor may be sufficient to reach the cooking temperature target, or a few degrees (e.g., not more than 10° C.) lower. If the latter, in one implementation, the liquor inside the digester can be circulated to an external form of heating to reach its desired temperature.

Once target temperature is reached it may be kept 306 until a desired H-factor is reached. An H-Factor target may be set, in one implementation, to result in bleachable pulp of suitable KN (e.g., for hardwood KN may be from 15-20 (e.g., in one implementation, from 16-18)).

An extra alkali charge (0-5%), either in the form of CCE filtrate or pure white liquor, may be added at one or multiple intermediate H-factors, e.g., to avoid the residual alkali concentration inside the digester reaching a low level that will promote lignin and hemicellulose precipitation trough the cooking phase.

A next step, in one implementation, includes the cooking liquor displacement with cold wash liquor 307, containing some residual alkali, e.g., higher than 2 gEA/l, such as to avoid lignin and hemicellulose precipitation.

In some implementations, the wash liquor may have its alkalinity increased, e.g., by the use of white liquor or CCE filtrate. Wash liquor temperature may be adjusted to a level such that the pulp discharge from the cooking vessel will be below boiling conditions.

A next step, in one implementation, includes pulp discharge from the cooking vessel 308, e.g., to an atmospheric discharge tank, atmospheric washing equipment (e.g. atmospheric diffuser), pressurized washing equipment (e.g. pressure diffuser), and/or the like.

A next step, in one implementation, includes washing of the pulp. In one implementation, the pulp may also be screened 222. Screening may be performed before or after washing of pulp, or after CCE stage.

A next step, in one implementation, includes the addition of cold fresh alkali 223, e.g., in the form of NaOH or White Liquor or a combination of both to perform the Cold Caustic Extraction (CCE) process.

For example, white liquor with a concentration from, e.g., 100-130 g EA/l (e.g., in one implementation from 115-125 gEA/l) and sulfidity of, e.g., 18-40% (e.g., in one implementation from 28-32%) may be used after being cooled, so as to adjust CCE stage to operate at temperature from, e.g., 20-50° C. (e.g., in one implementation from 30-35° C.) at a pulp mass consistency of, e.g., 3 to 15% in fiber weight (e.g., in one implementation from 8-12%) and an alkali concentration in the pulp slurry of, e.g., 50-120 g EA/l (e.g., in one implementation from 60-80 g EA/l). Pulp slurry concentration may be adjusted by the addition of a dilution liquid, e.g., in one implementation, filtrate from a washing stage after the CCE.

Retention time in CCE stages can, in various implementations, be from a few minutes to several hours. For example, in one implementation, the time span may be in the range of 15 to 30 minutes.

A next step, in one implementation, includes counter current washing of CCE pulp 224, e.g., in 2 or more washing stages (e.g., in one implementation from 3 to 4 stages), such as to recover CCE filtrate and minimize alkali and organic dissolved solid loss to subsequent bleaching processes.

Washing can be done with any kind of washing equipment (e.g., press, wash press, pressurized filters, vacuum filters, pressurized and atmospheric diffusers, and/or the like).

Various washing media may be used, e.g., pure water, condensate from evaporation plant, and/or other suitable washing liquor (e.g., EOP filtrate, P filtrate, and/or the like). Washing media temperature may depend, for example, on washing machine specifics, overall process mass, heat balance, and/or the like, and may be in the range of 50-85° C., but not restricted to that range.

A next step, in one implementation, includes bleaching the pulp 225, e.g., in a high selective bleaching sequence in order to minimize viscosity loss.

For Hardwood pulp, a 3-stage ECF sequence may be employed to reach final brightness of 89-91% ISO, whereas a 2-stage ECF sequence may be used for brightness level 86-90% ISO.

The bleaching sequence may include the use of viscosity preservers such as magnesium salts, chelating agents, and/or the like for the control of transition metals.

Next steps, in some implementations, may further include additional screening and/or sand removal 226; dewatering, pressing and drying 227; and finishing the resulting pulp in rolls, bales, and/or the like 228.

EXAMPLES

Further embodiments of High-A High-IV Pulp Production are demonstrated in the following examples. In some instances, the examples are based on principles presented in FIG. 2 and as well as the recipes presented in FIGS. 3A and 3B. Deviation and particulars are described in each example.

Example 1

Kraft process for high Intrinsic Viscosity high Purity pulp in one embodiment, using a single vessel steam phase continuous digester where main alkali source is untreated CCE filtrate.

Figure 4:
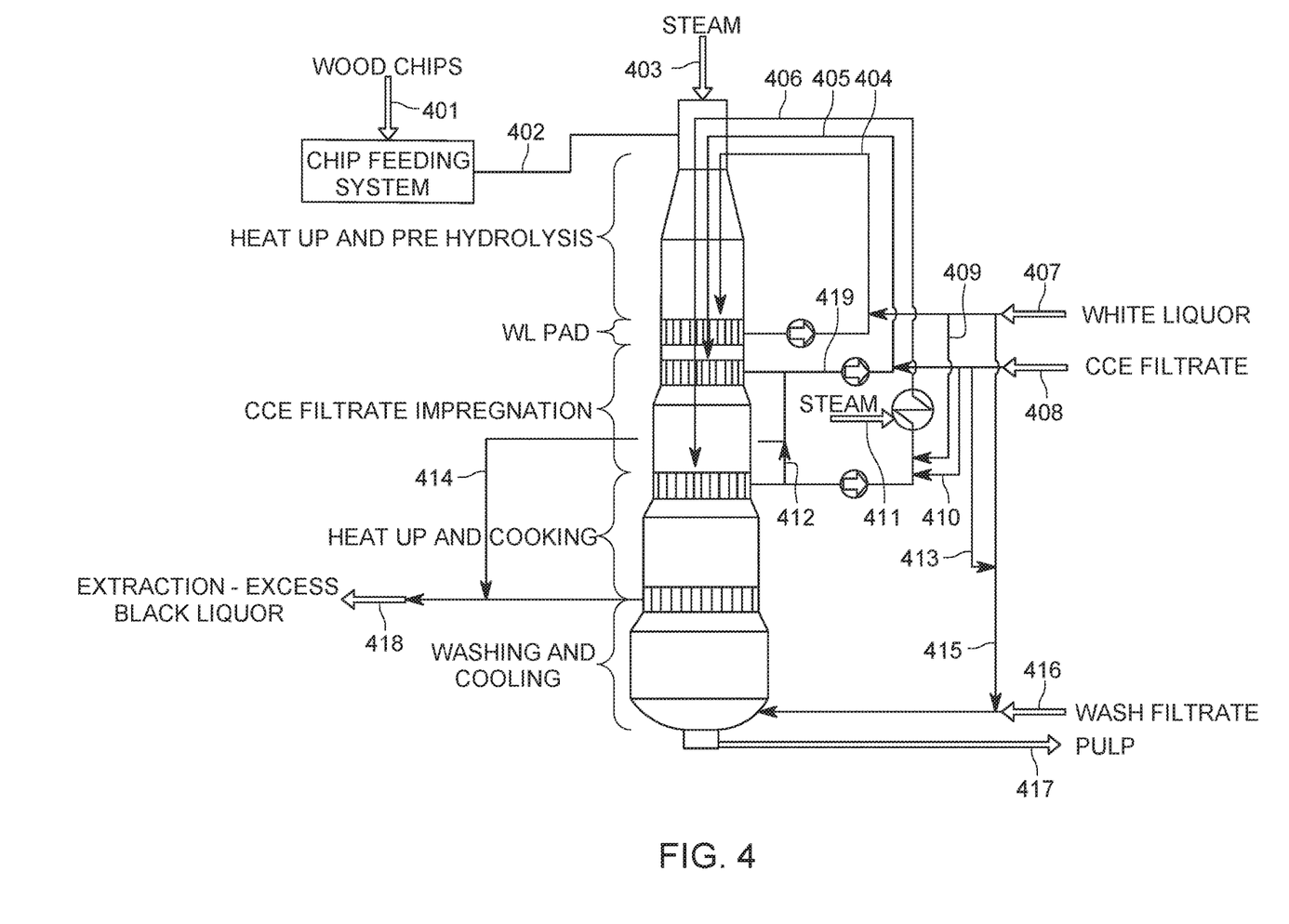
FIG. 4 shows an example representation of a single vessel continuous digester with steam phase pre-hydrolysis in one embodiment of High-A High-IV Pulp Production.

In this case the sequence shown in FIG. 2 is implemented in a single vessel continuous digester as described, in one embodiment, in FIG. 4. The cooking recipe follows closely the one presented in FIGS. 3A-3B.

The downstream process comprises washing, screening, CCE treatment, CCE washing and ECF bleaching as previously described.

Wood Chips (401) are processed via chip feeding system and transferred (402) to Digester vessel. In various implementations, the chip feeding system may comprise, e.g., chip silo with chip pumping system to feed the digester, chip silo with High Pressure Feeder to feed the digester, direct digester feeding with a metering and pressure locking device, and/or the like.

First Digester Section

In digester top the chips may be heated up with Steam (403) to desired temperature and retention time to achieve a given P factor. Chip level and/or liquor level may be controlled to establish defined specified retention time. Digester Pressure may be controlled to achieve the desired temperature without boiling.

Second Digester Section

A set of strainers may be located in a second digester section, such as to establish a circulation loop. Liquor may be extracted from digester, receive white liquor charge (407) and returned to digester via central pipe (404) above the said set of strainers. This circulation flow may be employed to facilitate white liquor pad effect.

Third Digester Section

A second set of strainers may be located in a third digester section, such as to establish a circulation loop. Liquor may be extracted from digester (419), receive a CCE filtrate charge (408) and returned to digester via central pipe (405) above the said set of strainers. This circulation flow may be employed to facilitate CCE filtrate distribution and impregnation process. Retention time may be selected to facilitate impregnation.

In one implementation, this circulation loop may include extraction capability (414) to facilitate digester liquor level control.

Fourth Digester Section

A third set of strainers may be located in a fourth digester section to establish a circulation loop. Liquor may be extracted from digester, receive a CCE filtrate charge (410) and/or white liquor charge (409), may be heated up with steam (411) and returned to digester via central pipe (406) above the said set of strainers. This circulation flow may be employed to facilitate alkali distribution and heat up process. Retention time may be selected to facilitate cooking time to desired H factor.

In one implementation, residual alkali may be adjusted in this step to facilitate kappa number control.

In one implementation, this circulation loop may include extraction capability (412) to facilitate digester liquor level control.

Fifth Digester Section

A fourth set of strainers may be located in a fifth digester section, such as to establish the main digester extraction flow. The extraction pipes (418) may be directed to heat recovery system, liquor filtration, and/or the like and then sent to evaporation plant.

Sixth Digester Section

Cold wash filtrate (416) may be introduced to digester bottom, such as to allow washing and/or cooling before the pulp discharge (417).

Retention time in this section may be selected to facilitate pulp cooling and to provide a washing effect as well.

In one implementation, white liquor (415) and/or CCE filtrate (413) may be used to correct the wash filtrate alkalinity.

In one implementation, pulp may be discharged from digester (417) at a selected temperature, below boiling point, to the subsequent process step (e.g., blow tank, pressure diffuser, and/or the like).

Example 2

Kraft process for high Intrinsic Viscosity high Purity pulp in one embodiment using a single vessel hydraulic phase continuous digester were main alkali source is untreated CCE filtrate.

Figure 5:
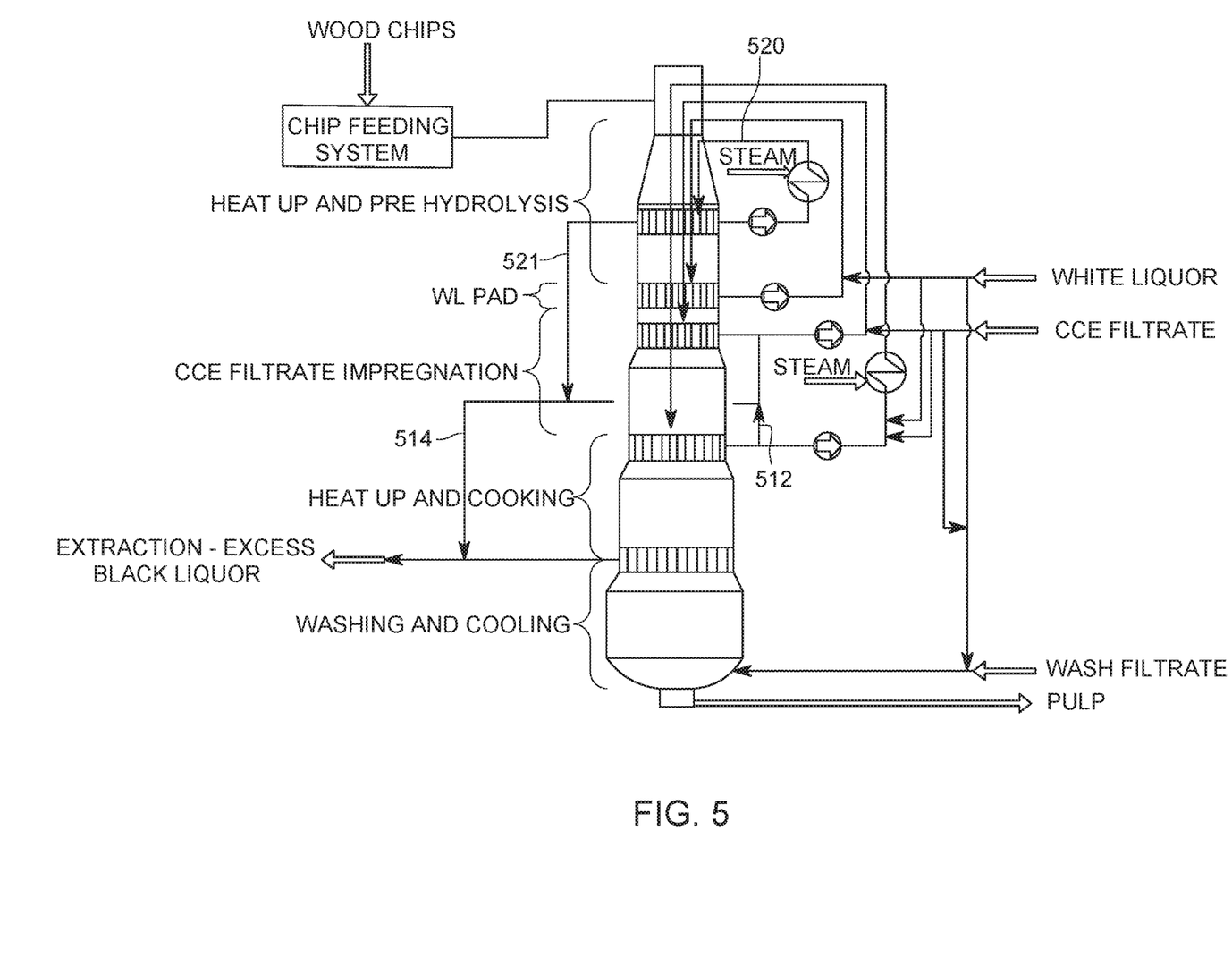
FIG. 5 shows an example representation of a single vessel continuous digester with aqueous phase prehydrolysis in one embodiment of High-A High-IV Pulp Production.

Principle diagram shown in one embodiment in FIG. 5.

Similar to principles described in connection with example 1 above, except that digester is hydraulically filled, employing one additional set of strainers in First digester section in order to establish a circulation loop. Liquor may be extracted from digester, heated and returned to digester via central pipe above the said set of strainers (520). This circulation flow may be employed to facilitate heat up to desired temperature. An extraction line may be employed to facilitate digester pressure control (512, 514, 521).

After the modified First digester section, the process may resume through remaining sections as described in example 1.

Example 3

Kraft process for high Intrinsic Viscosity high Purity pulp in one embodiment, using a two vessel steam phase continuous digester were main alkali source is untreated CCE filtrate.

Figure 6:
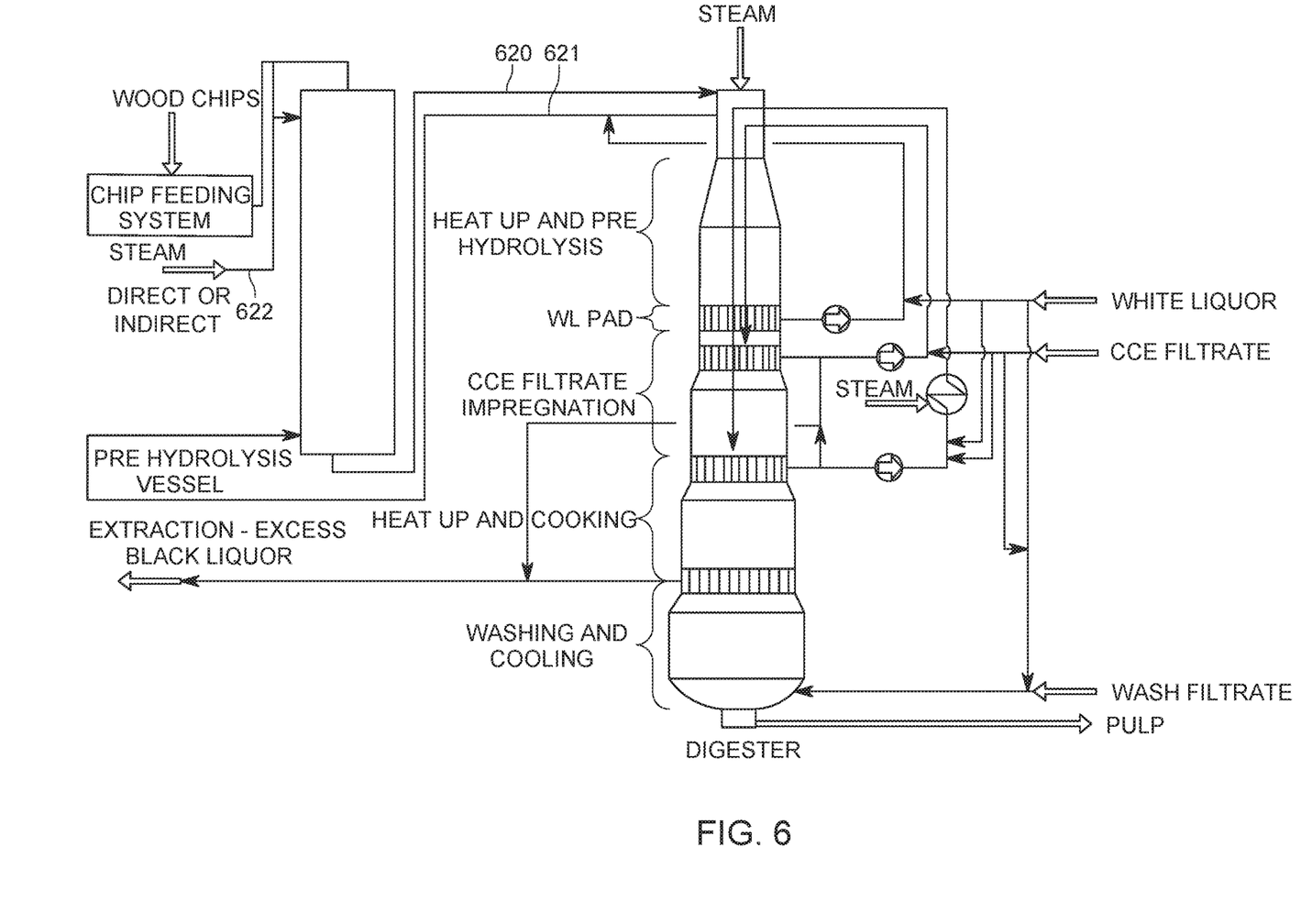
FIG. 6 shows an example representation of a two vessel continuous digester, with the pre-hydrolysis (aqueous and/or steam phase) being performed in the first vessel and the following cooking steps in the second vessel, in one embodiment of High-A High-IV Pulp Production.

Principle diagram shown in one embodiment in FIG. 6.

Similar to principles described in connection with example 1 above, except that a second vessel for pre hydrolysis may be introduced between chip feeding system and Digester. In some implementations, such vessel can be steam/liquor phase, hydraulically pressurized, and/or the like.

In one implementation, chips may be heated up to specified pre hydrolysis temperature, such as by direct steam injection in case of steam/liquor phase vessel 622, or by means of indirect heating by the establishment of a liquor circulating loop (strainer, circulation pump and heat exchanger) in the top of said vessel.

In one implementation, chip transfer for digester 620 may be achieved by pressurization with steam and/or compressed air in the top of such steam/liquor phase vessel and/or by use of a pressurization pump in chip feeding system, such as in the case of a hydraulically filled vessel.

In another implementation, chip pumping may be used for chip transference between pre hydrolysis vessel and digester.

Such vessel may employ a retention time set so as to reach a desired P factor.

After transfer to digester, the process may proceed as described in example 1, with the possible optimization of doing the white liquor pad addition in the transfer loop between both said vessels (pre hydrolysis and digester, 620 and 621) using this circulation loop as a replacement from sections 1 and 2.

Example 4

Kraft process for high Intrinsic Viscosity high Purity pulp in one embodiment using a batch digester system where main alkali source is untreated CCE filtrate.

Figure 7:
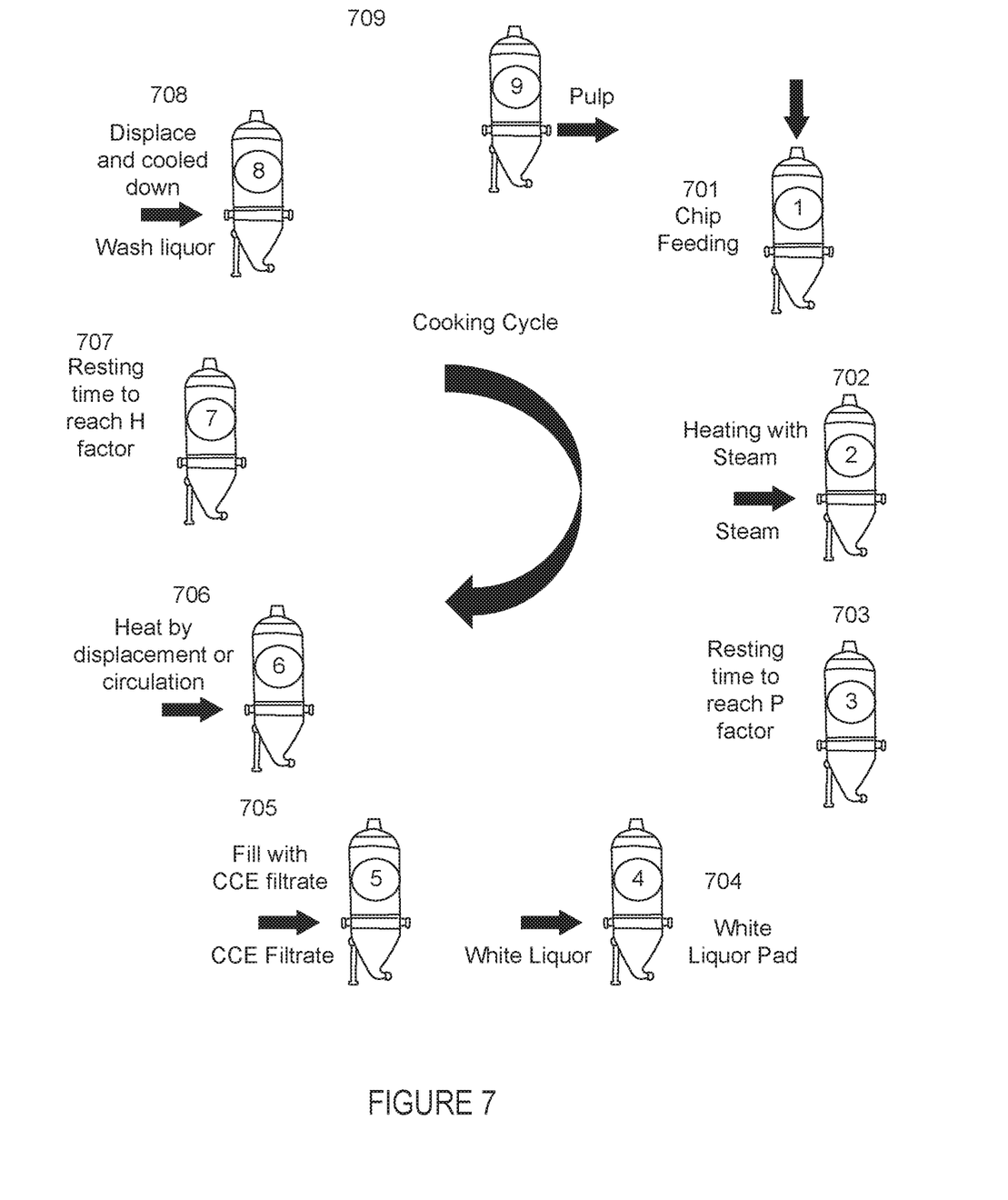
FIG. 7 shows a representation of a batch cooking plant process in one embodiment of High-A High-IV Pulp Production.

Principle diagram shown in one embodiment in FIG. 7.

In one implementation, a first step the cooking vessel (digester) includes filling with wood chips 701. In one implementation, a small amount of steam may be added to facilitate chip packing and start the heating process.

In one implementation, a second step may include, with the cooking vessel full of chips and closed, heating up to specified temperature and pressure 702.

In one implementation, a third step may include maintaining specified conditions (e.g., of temperature and pressure) until target P factor is reached 703.

In one implementation, a fourth step may include introducing white liquor pad to the cooking vessel 704.

In one implementation, a fifth step may include introducing a specified amount of pre heated CCE filtrate in the cooking vessel and waiting for a specified degree of impregnation to be achieved 705.

In one implementation, a sixth step may include heating up the vessel to cooking temperature 706. For example, that may be achieved by circulating the liquor present in the vessel through an external heater, by displacing the liquor present in the vessel with hot black liquor of controlled alkalinity, and/or the like. In one implementation, in this stage extra alkali charge from fresh white liquor or from CCE filtrate can be introduced, such as via circulation, displacement, and/or the like.

In one implementation, a seventh step may include keeping specified conditions until target H factor is reached 707.

In one implementation, an eighth step may include displacing the liquor present in the vessel 708, e.g., with cooled wash liquor so as to cool down the product to below boiling point at discharge condition.

In one implementation, a ninth step may include discharging the cooking vessel 709, e.g., so it is empty and ready to restart the cooking cycle.

In order to address various issues and advance the art, the entirety of this application for HIGH ALPHA AND HIGH INTRINSIC VISCOSITY PULP PRODUCTION APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any process steps and/or feature sets as described in the figures and/or throughout are not limited to a fixed operating order and/or arrangement, but rather, any disclosed order is exemplary and all equivalents, regardless of order, are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. A method for high intrinsic viscosity pulp production, comprising:

performing pre-hydrolysis kraft process cooking of hardwood chips in a digester via steam heating to obtain a pre-hydrolysis condition comprising a P factor from 10 to 30;

adding a white liquor pad to the cooked hardwood chips, wherein the white liquor pad comprises 0% to 5% of a weight of the hardwood chips;

pre-heating a non-purified cold caustic extraction filtrate having a filtrate concentration of between 40 gEA/l and 60 g EA/l to a filtrate temperature of between 120° C. and 130° C.;

adding the non-purified cold caustic extraction filtrate to produce alkali impregnated cooked hardwood chips;

heating the alkali impregnated cooked hardwood chips to a target temperature between 140° C. and 150° C. to reach a target H-factor corresponding to a kappa number between 16 and 18 and produce pulp;

displacing cooking liquor with a cold wash liquor comprising residual alkali at concentration higher than 2 gEA/l until the pulp is below boiling conditions;

discharging the pulp from the digester to at least one of an atmospheric discharge tank, atmospheric washing equipment; and pressurized washing equipment;

washing the pulp;

screening the pulp;

adding cold fresh alkali, comprising NaOH, white liquor, or both, to the pulp for cold caustic extraction to operate at an extraction temperature of between 30° C. and 35° C. for an extraction time of between 15 and 30 minutes;

performing counter current washing of the pulp at a washing temperature of between 50° C. and 85° C. to recover the cold caustic extraction filtrate;

bleaching the pulp in a high selective bleaching sequence comprising a three stage ECF sequence to reach final brightness of between 89% and 91% ISO, wherein the bleaching includes adding at least one of a magnesium salt and a chelating agent;

dewatering the pulp;

pressing the pulp;

drying the pulp; and forming the pulp into rolls or bales.

2. The method of claim 1, wherein heating the alkali impregnated raw material further comprises:

adding a quantity of hot black liquor heated to a liquor temperature in the range of 130° C. to 170° C.

3. The method of claim 1, further comprising:

adding extra alkali charge to the raw material during cooking at intermediate H-factor values before the target H-factor is reached.

4. The method of claim 1, wherein the cold fresh alkali is the white liquor having an alkali concentration in the range of 100 gEA/l to 130 gEA/l and a sulfidity in the range of 18% to 40%.

5. The method of claim 1, wherein the counter current washing is performed by at least one of a press, wash press, pressurized filter, vacuum filter, pressurized diffuser, or atmospheric diffuser.

6. The method of claim 1, wherein the counter current washing is performed with wash media comprising at least one of pure water and evaporation plant condensate.

7. The method of claim 1, wherein the digester comprises a batch digester.

8. The method of claim 1, wherein the digester comprises a continuous digester.

* * * * *